United States Patent
Hartmann (10) Patent No.: US 6,286,663 B1
(45) Date of Patent: Sep. 11, 2001

(54) CONVEYOR DEVICE

(75) Inventor: Eduard Hartmann, Schneisingen (CH)

(73) Assignee: Bucher-Guyer AG, Niederweningen (CH)

( * ) Notice: Subject to any disclaimer, the term of this patent is extended or adjusted under 35 U.S.C. 154(b) by 0 days.

(21) Appl. No.: 09/424,779

(22) PCT Filed: Mar. 31, 1999

(86) PCT No.: PCT/CH99/00134

§ 371 Date: Nov. 30, 1999

§ 102(e) Date: Nov. 30, 1999

(87) PCT Pub. No.: WO99/52801

PCT Pub. Date: Oct. 21, 1999

(30) Foreign Application Priority Data

Apr. 14, 1998 (DE) .............................................. 198 16 466

(51) Int. Cl.⁷ .................................................. B65G 39/16
(52) U.S. Cl. ...................... 198/810.03; 198/806
(58) Field of Search .................... 198/806, 807, 198/810.03; 226/19, 20

(56) References Cited

U.S. PATENT DOCUMENTS

| | | | |
|---|---|---|---|
| 3,726,588 | * 4/1973 | Moser | 198/806 |
| 3,743,152 | 7/1973 | Greeves | 226/19 |
| 5,078,263 | * 1/1992 | Thompson et al. | 198/806 |
| 5,699,898 | * 12/1997 | Bartelmuss et al. | 198/806 |
| 5,896,979 | * 4/1999 | Hokari et al. | 198/806 |
| 5,911,304 | * 6/1999 | Cumberlege | 198/806 |
| 5,960,936 | * 10/1999 | Kuehnle et al. | 198/807 |
| 6,000,531 | * 12/1999 | Martin | 198/806 |

FOREIGN PATENT DOCUMENTS

| | | |
|---|---|---|
| 31 52 151 | 7/1983 | (DE) . |
| 570 873 | 7/1945 | (GB) . |
| 1 040 451 | 8/1966 | (GB) . |

* cited by examiner

*Primary Examiner*—Douglas Hess
(74) *Attorney, Agent, or Firm*—Burns, Doane, Swecker & Mathis, L.L.P.

(57) ABSTRACT

In a conveyor device having a conveyor belt revolving around at least two rollers, in which at least one of the rollers is held rolatably on a rotary bearing, and is displaceable at least partly in the axial direction relative to the rotary bearing, it is proposed that a rotary bearing be used that has a bearing part that is rotatable about the axis of the roller held thereon; the roller held on the rotary bearing is provided with a structural component that penetrates the rotary bearing and is coupled in a manner fixed against relative rotation to the bearing part and is displaceable in the axial direction relative to the bearing part.

21 Claims, 6 Drawing Sheets

CONVEYOR DEVICE

The invention relates to a conveyor device, having a conveyor belt that revolves around at least two rollers, in which at least one of the rollers is held rotatably on a rotary bearing and is displaceable at least partly in the axial direction relative to the rotary bearing.

Belt conveyor systems used as continuous conveyors are employed today not only for conveying purposes but increasingly also in conjunction with a further treatment of the product being conveyed. Particularly in the food industry, drying of foods conveyed on the conveyor belt has gained an importance. For the drying, a heating element disposed between the upper and lower runs of the conveyor belt is used. For promoting the drying process, the conveyor belt can also be disposed in an evacuatable vacuum chamber. To assure high efficiency of the drying system, typically especially thin conveyor belts are used, which permit a good heat transfer between the heating element and the material to be dried. When these especially thin conveyor belts are used, however, dislocation or shifting of the conveyor belt along the driving and/or deflection rollers along the conveyor device often occurs. To eliminate this dislocation and shifting, tilting mechanisms have been proposed, with which the driving and/or deflection rollers are tilted about a tilt axis extending at right angles to the roller axis. In cooperation with the tension of the conveyor belt, such tilting can counteract an axial displacement and to a lesser extent even dislocation of the conveyor belt along the roller axis. However, it has been found that because of the attendant extra engineering effort and expense, using these tilting mechanisms makes for inadequate operational reliability of the conveyor device.

To overcome this drawback, it has been proposed that shifting of the conveyor belt in the direction of the pivot axis of a driving and/or deflection roller be counteracted by an axial displacement of the roller itself. However, it has then proved disadvantageous that an axial displacement of rotatably supported roller parts, such as shaft or axle stubs, cause high wear to the rotary bearing. When belt conveyors are used in evacuatable chambers, in which the rotary bearing is disposed on the chamber wall, it has also proved disadvantageous that the sealing action of a sealing element, which upon a rotation of the roller part received in the rotary bearing provides satisfactory sealing of the interior of the chamber from the environment, rapidly decreases upon an axial displacement of the rotatably supported roller part in the rotary bearing. This in turn leads to a marked impairment in operational reliability of such conveyor devices.

To overcome this drawback, belt conveyors intended for use in evacuatable chambers have been proposed that have a driving and/or deflection roller; one roller part is held rotatably via axle or shaft stubs but fixedly in the axial direction in opposed chamber walls, and one roller part is mounted axially displaceably on the roller part that is fixed in the axial direction. In a belt conveyor of this type, disclosed in German Patent DE 31 52 151 C2, the axially displaceable roller part is in the form of a circular- cylindrical jacket-segmental half shell, which is retained on the axle or shaft stubs by retaining rings.

In this latter reference, but also in U.S. Pat. No. 3,743, 152, conveyor devices of the type described are disclosed in which bars are provided, which are secured axially displaceably on the axially fixed roller part. In these belt conveyors, the axial displacement of the axially displaceable roller parts is accomplished with adjusting elements, in the form of pneumatic cylinders or electrical or mechanical means to displace, which are disposed inside the evacuatable chamber. On the one hand, this increases the total volume to be evacuated, and on the other it impairs the operational reliability, because leaks from pneumatic cylinders that can be used as the adjusting element can increase the pressure inside the evacuatable chamber; corrections initiated from outside via mechanical linkages are complicated and expensive and can also lead to sealing problems, and if electrical adjusting elements are used, handling products containing explosive volatile components is risky from the standpoint of safety. Overall, the known belt conveyors are thus functionally relatively unsafe and unreliable, and problems repeatedly occur during operation.

In view of the above-explained problems in the prior art, the object of this invention is to disclose a structurally simple conveyor device which assures high operational reliability and functional safety.

According to the invention, this object attained by a conveyor device of the type defined at the outset, which is substantially characterized in that the rotary bearing has a bearing part that is rotatable about the, axis of the roller held therein and the roller held on the rotary bearing is provided with a structural component which penetrates the rotary bearing and is coupled to the bearing part in a manner fixed against relative rotation and which is displaceable axially relative to the bearing part.

This invention is based on the recognition that the problems observed in the use of known conveyor devices with a rotary leadthrough allowing an axial displacement, that is, problems of durability of the rotary leadthrough and of the sealing action of sealing elements associated with the rotary leadthrough, can be solved by decoupling the axial displacement of the roller, or a roller part, from the rotary motion. With the conveyor device of the invention, this decoupling is accomplished by providing the rotary bearing with, a bearing part that is rotatable about the axis of the roller retained thereon, and the axial displacement is effected via a structural component that is entrained in a rotary motion of this bearing part. With this arrangement, the axial displacement of the roller, or of the axially displaceable roller part, can be initiated via the structural component that penetrates the rotary leadthrough and is thus accessible on the side of the rotary bearing away from the roller. In this way, the axial displacement of a built-in conveyor belt in an evacuatable chamber can be effected with an adjusting mechanism disposed outside the chamber, via the structural component that penetrates the rotary bearing. As a result, the volume that has to be evacuated can be reduced, and at the same time the operational reliability is increased, because except for the axially displaceable roller part, no further adjusting element has to be disposed inside the evacuatable chamber.

Particularly to eliminate dislocation of the conveyor belt, but also axial shifting of the conveyor belt relative to the rollers of the conveyor device itself, it has proved especially expedient for the roller to have at least two roller parts, forming successive outer faces of the roller in the circumferential direction, on of the faces being coupled to the axially displaceable structural component, and the other face being fixed axially relative to the rotary bearing. With this arrangement, an axial displacement relative to the roller itself can be eliminated by providing that in a phase of operation in which the outer face of the roller part that is coupled with the axially displaceable structural component does not rest on the conveyor belt, this roller part is displaced axially in the direction of displacement of the conveyor belt, while in the phase of operation. in which its outer face does contact the conveyor belt, this roller part is displaced in the opposite direction. In this respect, it has proved to be especially favorable if a sensor that detects the location of the conveyor belt and by a control unit, with which an adjusting mechanism, coupled to the structural component coupled in a manner fixed against relative rotation to the rotatable bearing part, is triggered in response to detection signals output by the sensor.

For reasons of stability, it has proved especially advantageous if the roller part that is fixed in the axial direction relative to the rotary bearing is coupled to the rotatable bearing part. The rotatable bearing part can especially simply be in the form of a preferably hollow-cylindrical sleeve penetrated by a recess. In this embodiment, the structural component coupled in a manner fixed against relative rotation to the rotatable bearing part expediently has the form of an axle stub or shaft stub, preferably of approximately circular-cylindrical shape, that is received in the recess.

A further increase in the stability of the conveyor device of the invention can be attained if the structural component coupled in a manner fixed against relative rotation to the rotatable bearing part is a shaft, preferably a solid shaft, that supports the roller parts that form the outer face of the roller.

From the standpoint of production technology, it has proved to be especially favorable if at least on of the roller parts, forming the outer face of the roller has the form of a circular-cylindrical jacket segment, preferably a circular-cylindrical jacket half shell, that is, a part obtained by cutting a circular-cylindrical jacket along an axial plane.

To assure satisfactory conveying performance without slip, the outer face of the roller is expediently provided at least in part with friction-increasing means. These means may for instance be in the form of a coating of an elastomer material, preferably rubber. For the controlled removal of soiling, the friction-increasing means can also have radial protrusions that extend in the axial direction and are separated from one another by grooves. If the conveyor belt is built in or installed together with the rollers in a closable and preferably also evacuatable chamber, then the rotary bearing can be disposed in a chamber wall, and the structural component coupled in a manner fixed against relative rotation to the rotatable bearing part penetrates the chamber wall and is accessible outside the chamber. In this arrangement, the axial displacement can be accomplished with an adjusting mechanism disposed outside the chamber.

If a conveyor device according to the invention is built into an evacuatable chamber, then satisfactory sealing of the rotary bearing built into a chamber can be obtained if a rotary seal is disposed between the rotatable bearing part and the chamber wall, which is designed to assure a reliable sealing action upon a rotary motion. Such a rotary seal may be realized in the form of an O-ring.

The conveyor device of the invention also has a sliding seal disposed between the rotatable bearing part and the structural component coupled in a manner fixed against relative rotation to it; with this seal, reliable sealing upon an axial displacement of the structural component coupled to the rotatable bearing part is assured. Such a sliding seal can for instance have an encompassing sealing lip that forms an acute angle with the bearing axis. An especially good sealing action is obtained if the sealing lip is fixed to the bearing part, or to the structural component coupled in a manner fixed against relative rotation to it, and extends from there obliquely outward in the axial direction, toward the respectively other structural component. In this arrangement, the atmospheric pressure that acts on the sealing element from outside brings about an increase in the sealing action.

If the axially displaceable roller part is disposed on a driving roller, then the drive mechanism that generates a rotary motion of the driving roller can be coupled to the rotatable bearing part and/or to the structural component coupled to it in a manner fixed against relative rotation.

The invention will be described below in conjunction with the drawing, to which express reference is made with respect to all the details essential to the invention that are not described in detail in the description. The drawing shows:

FIG. 1b, a radial section, taken along the sectional plane A—A in FIG. 1a, through the driving roller of FIG. 1a;

Figure 1A:
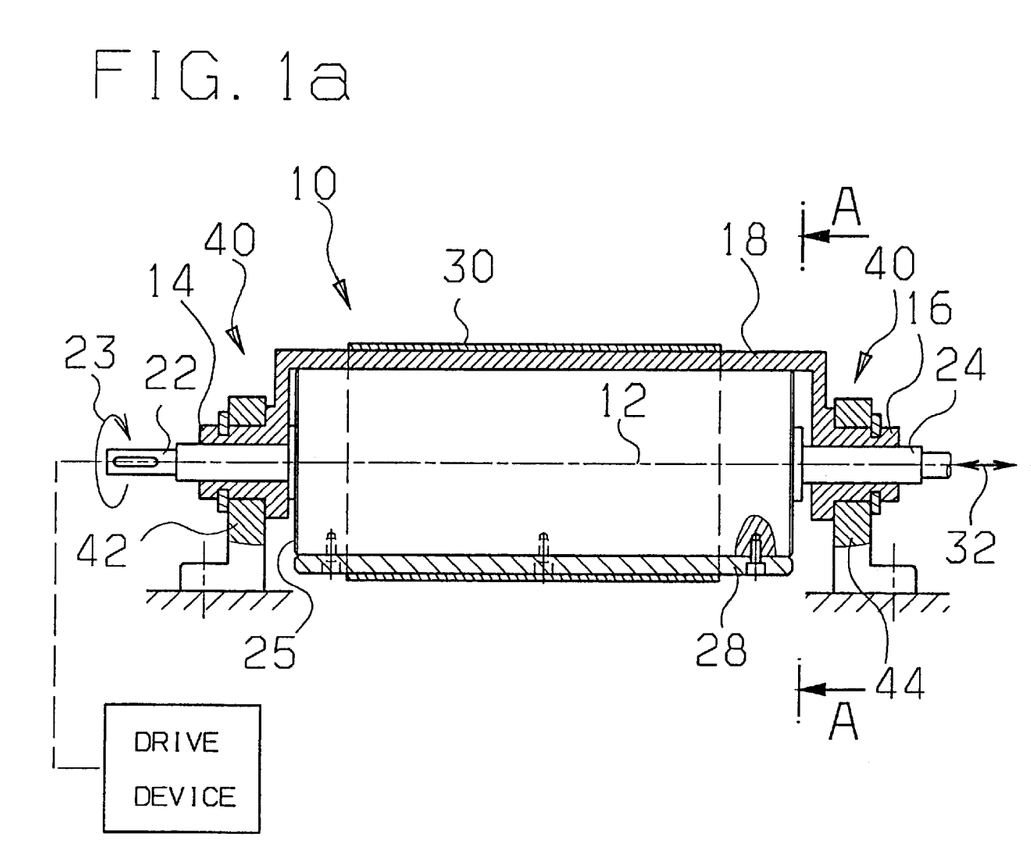
FIG. 1a, an axial section through a driving roller of a conveyor device in a first embodiment of the invention.
Figure 1B:
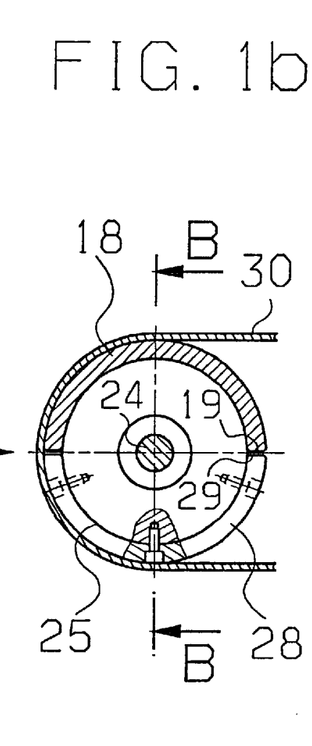

The driving roller, shown in FIG. 1, of a conveyor device in a first embodiment of the invention includes a driving roller 10 around which a conveyor belt 30 revolves and which is rotatably supported on a retainer 40 that has one retaining element 42 and 44 on each side of the roller. To that end, approximately circular-cylindrical jacket-like sleeves 14 and 16 are received rotatably, but axially non-displaceably, in the retaining parts 42 and 44 disposed on opposed sides of the driving roller 10. The sleeves 14 and 16 are integrally joined together via a roller part 18. The roller part 18 forms part of the outer face of the driving roller, in the form of a circular-cylindrical jacket half-shell (see FIG. 1b).

Each of the sleeves 14 and 16, which are rotatable about the roller axis 12, receives one shaft stub 22 and 24, respectively, of a solid shaft 25. The solid shaft 25 is axially displaceable together with the shaft stubs 22 and 24 relative to the sleeves 14 and 16, as indicated by the double arrow 32.

A roller part 28 forming a further part of the outer face of the driving roller is secured to the solid shaft 25. This roller part is also in the form of a circular-cylindrical jacket half shell. The roller part 28 is secured to the solid shaft 25 with screws. This assures that the roller part 28 will follow along with an axial displacement of the solid shaft 25, or the shaft stubs 22 and 24, relative to the sleeves 14 and 16.

As shown especially clearly in FIG. 1b, the end faces 19 of the circular-cylindrical jacket half shell 18 contact the end faces 29 of the circular-cylindrical jacket half shell 28. This achieves a coupling in a manner fixed against relative rotation of the circular-cylindrical jacket half shell and thus of the shaft 25 and shaft stubs 22 and 24, to the sleeves 14 and 16 that are integrally joined to the roller part 18. In this way, the axial displacement of the roller part 28 is decoupled, via the shaft stubs 22 and 24 and the shaft 25, from the rotation of the sleeves 14 and 16 in the retaining parts 42 and 44, which brings about a marked relief of the rotary bearing formed by the retaining parts 42 and 44 and the sleeves 14 and 16. In the embodiment shown here, the drive of the driving roller 10 can be effected via the shaft stub 22, as indicated by the arrow 23.

Figure 2A:
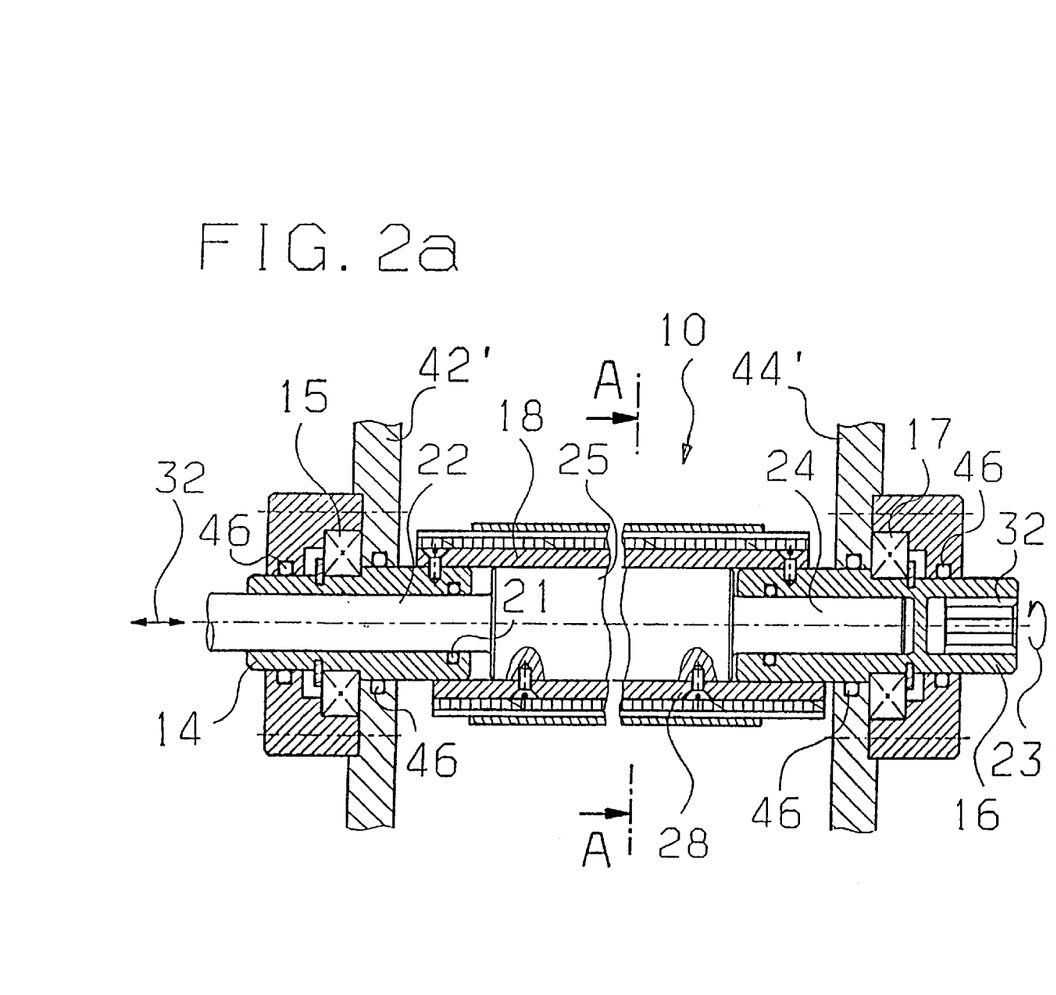
FIG. 2a, an axial section through a driving roller of a conveyor device in a second embodiment of the invention.
Figure 2B:
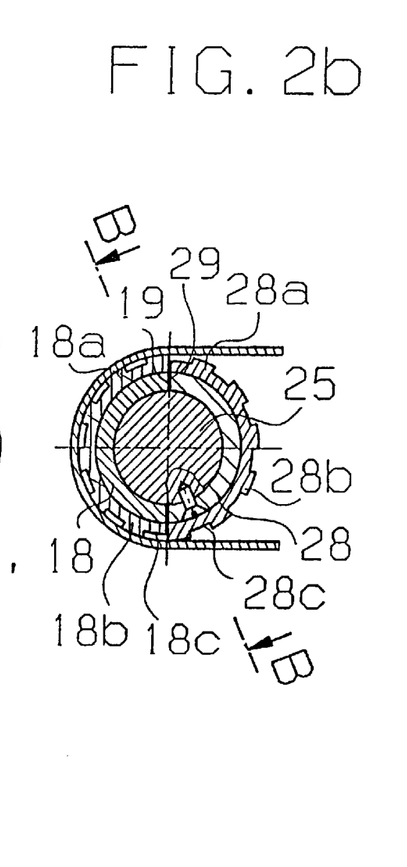
FIG. 2b, a radial section through the drive roller of FIG. 2a taken along the sectional plane A—A.

In the embodiment of the invention shown in FIG. 2, those components that correspond to the components already described in conjunction with FIG. 1 are assigned the same reference numerals. In a departure from the embodiment of FIG. 1, the driving roller 10 of the embodiment shown in FIG. 2 is disposed in a vacuum chamber, and the sleeves 14 and 16 are rotatably supported in opposed walls of the vacuum chamber. The rotary support is effected via ball bearings 15 and 17. Sealing off the interior of the vacuum chamber at the leadthrough of the bushes 16 and 14 through the chamber walls 42' and 44' with the aid of O-rings 46. In the embodiment of the invention shown in FIG. 2, the shaft part 18 is secured to the rotatable bearing parts 14 and 16 with a screw connection. Shaft stubs 22 and 24 of a solid shaft 25 are received in the sleeves 14 and 16. Sealing off of the leadthrough of the shaft stub 22 in the sleeve 14 is effected here with the aid of a sealing element 21 disposed between the sleeve 14 and the shaft stub 22. As indicated by the double arrow 32, the solid shaft 25 is axially displaceable together with the shaft stubs 22 and 24 relative to the sleeves 14 and 16. A roller part 28 forming an outer face of the roller and in the form of a half shell is secured to the solid shaft 25 and is disposed to be axially displaceable together with the solid shaft 25 relative to the sleeves 14 and 16 and thus also relative to the roller part 18. In this embodiment of the invention as well, the end faces 19 of the roller part 18 contact the end faces 29 of the roller part 28, as shown in FIG. 2b. As a result, a coupling in a manner fixed against relative rotation of the roller part 28 is achieved via the solid shaft 25 and the shaft stubs 22 and 24 to the rotatable bearing parts 14 and 16 that are connected to the roller part 18 via the screw connection.

As shown especially clearly in FIG. 2b, the roller parts 18 and 28 have rubber-like elements 18a and 28a on their outer faces, and these elements are provided with axially extending protrusions 18b and 28b, which are separated from one another by grooves 18c and 28c that also extend in the axial direction.

In this embodiment of the invention, the rotational drive of the roller 10 is effected, as indicated by the arrow 23', via a splined sleeve 32 received in the sleeve 16.

In the embodiments of the invention described in conjunction with FIGS. 1 and 2, the solid shaft 25 forms a bearing surface for the roller parts 28 and 18 that are connected to the rotatably supported sleeves 14 and 16. In cooperation with the shaft stubs received in the sleeves 14 and 16, stabilization of the entire roller is thus achieved.

Figure 3A:
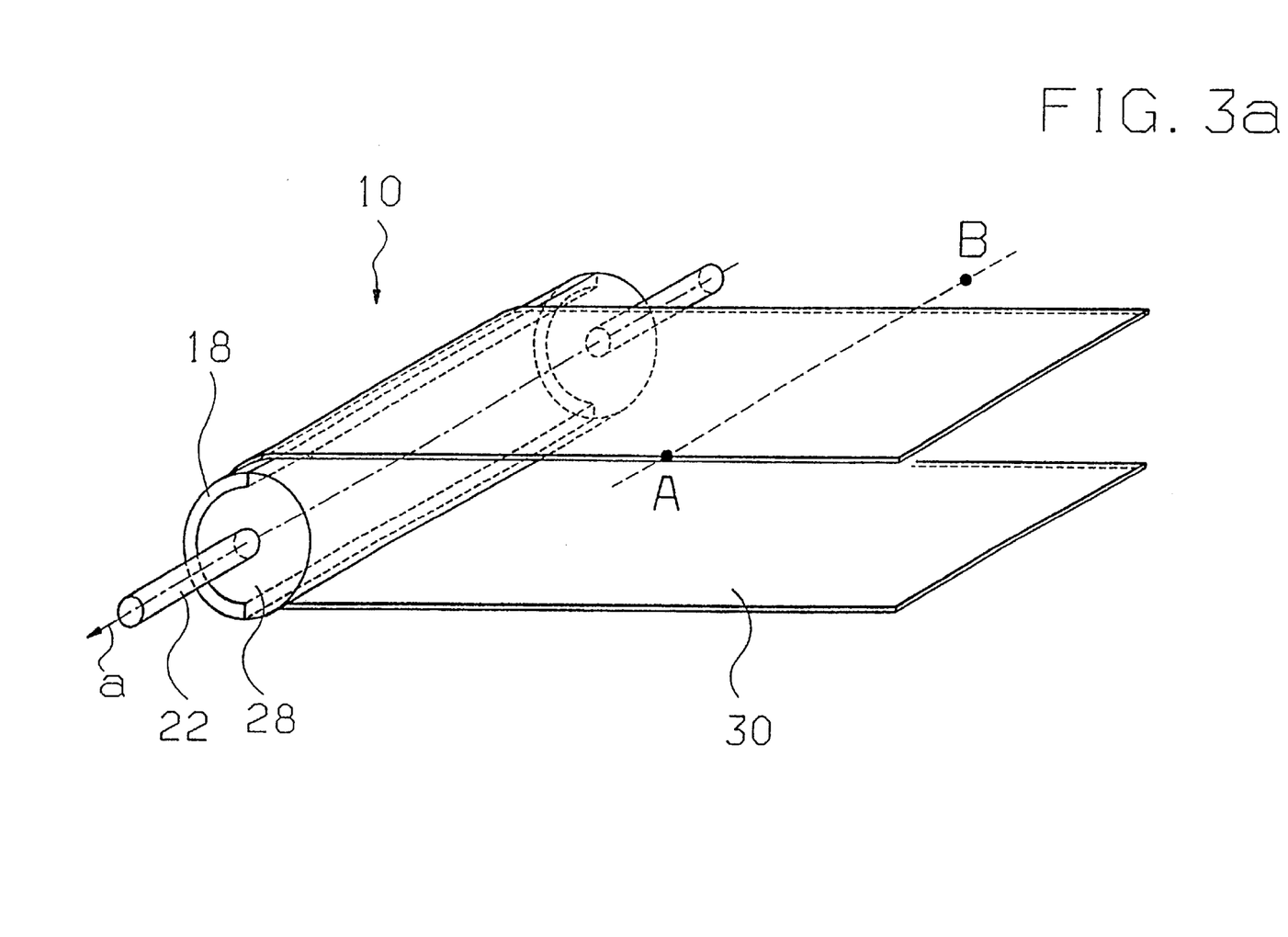
FIGS. 3a through 3d, perspective views of a conveyor device according to the invention, for explaining the function of this conveyor device.
Figure 3B:
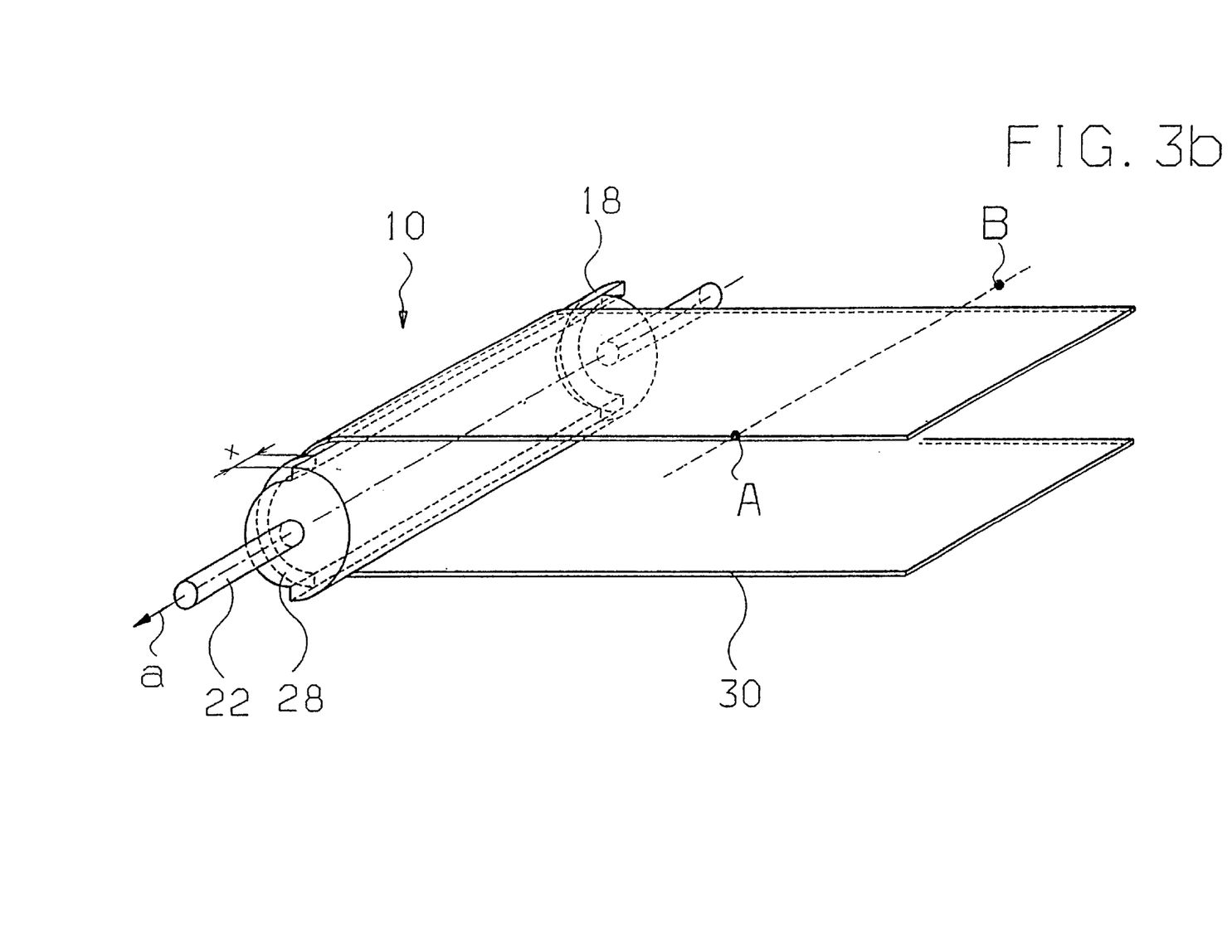
Figure 3C:
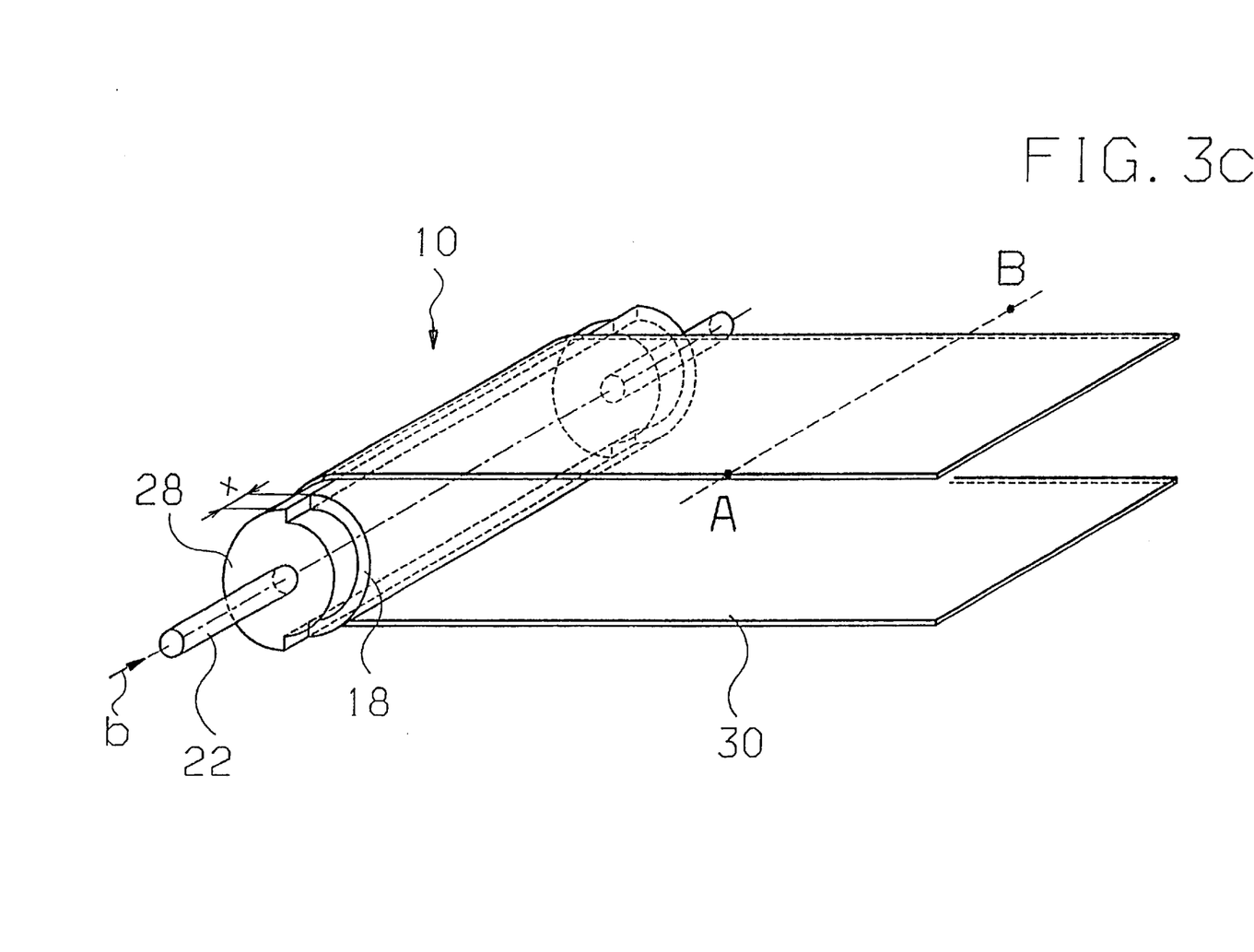
Figure 3D:
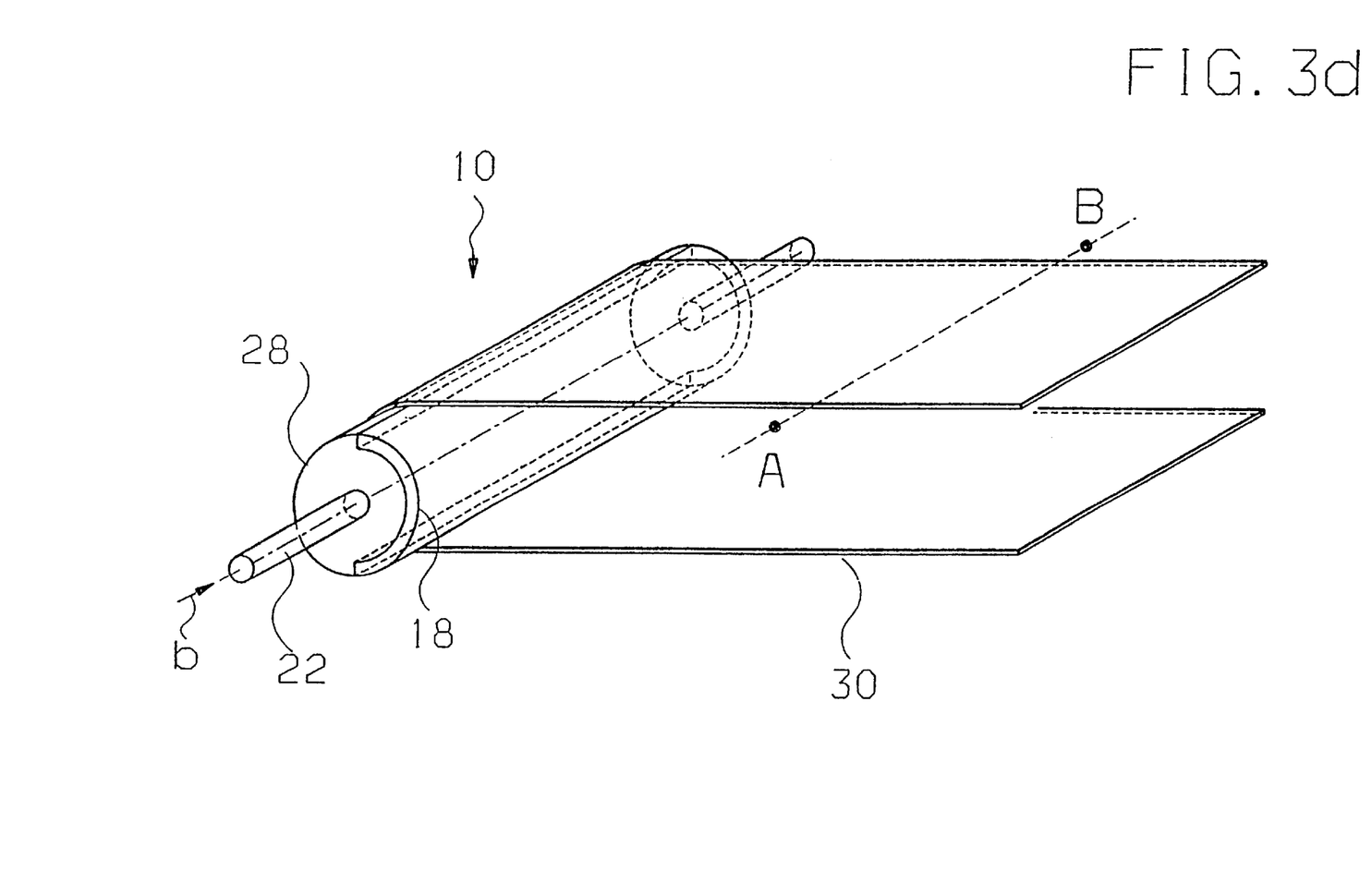

The function of the conveyor device of the invention will now be explained in conjunction with FIGS. 3a through 3d. If a sensor A detects that the conveyor belt 30 has been displaced in the direction indicated by the arrow a, the roller part 28 is displaced (FIG. 3b), via the shaft stub 22, in the direction indicated by the arrow a, in an operating phase in which the conveyor belt 30 contacts the roller part 18 but not the roller part 28. If by rotation of the roller 10 the roller part 28 comes into contact with the conveyor belt 30, then it can be displaced by an adjusting mechanism, not shown in the drawing, in response to control signals generated by a control unit as a function of detection signals output by the detector A, in the opposite direction from the direction represented by the arrow a, as indicated in FIGS. 3c and 3d by the arrow b. This counteracts the undesired displacement of the conveyor belt 30. In the ensuing phase of operation, in which again only the roller part 18 but not the roller part 28 contacts the conveyor belt, the roller part 28 can be displaced back into a central position (see FIG. 3a).

What is claimed is:

1. A conveyor device, having a conveyor belt (30) that revolves around at least two rollers (10), in which at least one of the rollers (10) is held rotatably on a rotary bearing (14, 15, 16, 42, 42', 44, 44') and is displaceable at least partly in the axial direction relative to the rotary bearing, characterized in that the rotary bearing has a bearing part (14, 16) that is rotatable about the axis of the roller (10) held therein, and the roller (10) held on the rotary bearing is provided with a structural component (22, 24) which penetrates the rotary bearing and is coupled to the bearing part (14, 16) in a manner fixed against relative rotation and which is displaceable axially relative to the bearing part (14, 16).

2. The conveyor device of claim 1, characterized in that the roller has at least two roller parts (18, 28), forming successive outer faces of the roller in the circumferential direction, of which one face (28) is coupled to the axially displaceable structural component (22, 24), and the other face (18) is fixed in the axial direction relative to the rotary bearing.

3. The conveyor device of claim 2, characterized in that the roller part (18) that is fixed in the axial direction relative to the rotary bearing is coupled to the rotatable bearing part (14, 16).

4. The conveyor device of claim 2, characterized in that the rotatable bearing part (14, 16) has the form of a sleeve penetrated by a recess, and the structural component (22, 24) coupled to the rotatable bearing part (14, 16) in a manner fixed against relative rotation has the form of an axle stub or shaft stub received in the recess.

5. The conveyor device of claim 4, characterized in that the structural component (22, 24), coupled to the rotatable bearing part (14, 16) in a manner fixed against relative rotation is a shaft that supports the roller parts (18, 28) that form the outer face of the roller (10).

6. The conveyor device of claim 2, characterized in that at least one of the roller parts (18, 28), forming the outer face of the roller (10) has the form of a circular-cylindrical jacket segment.

7. The conveyor device of claim 2 characterized in that the rotatable bearing part (14, 16) has the form of a hollow-cylindrical sleeve penetrated by a recess, and the structural component (22, 24) coupled to the rotatable bearing part (14, 16) in a manner fixed against relative rotation has the form of an approximately circular-cylindrical axle stub or shaft stub received in the recess.

8. The conveyor device of claim 7, characterized in that the structural component (22, 24), coupled to the rotatable bearing part (14, 16) in a manner fixed against relative rotation is a shaft that supports the roller parts (18, 28) that form the outer face of the roller (10).

9. The conveyor device of claim 2 characterized in that at least one of the roller parts (18, 28), forming the outer face of the roller (10) has the form of a circular-cylindrical jacket half shell.

10. The conveyor device of claim 1, characterized in that the conveyor belt (30) together with the rollers (10) is disposed in a closable and preferably evacuatable chamber, and at least one rotary bearing is disposed in a chamber wall (42', 44') and the structural component (22, 24) coupled in a manner fixed against relative rotation to the rotatable bearing part (14, 16) penetrates the chamber wall (42', 44').

11. The conveyor device of claim 10, characterized in that a rotary seal (46) is disposed between the rotatable bearing part (14, 16) and the chamber wall.

12. The conveyor device of claim 11, characterized in that the rotary seal has at least one O-ring (46).

13. The conveyor device of claim 1, characterized in that a sliding seal (21) is disposed between the rotatable bearing part (14, 16) and the structural component (22, 24) coupled to it in a manner fixed against relative rotation.

14. The conveyor device of claim 13, characterized in that the sliding seal has an encompassing sealing lip that forms an acute angle with the roller axis.

15. The conveyor device of claim 1, characterized in that a drive device is coupled to the rotatable bearing part (16) and/or to the structural component (22) coupled in a manner fixed against relative rotation to the rotatable bearing part (16).

16. The conveyor device of claim 1, characterized in that an adjusting mechanism that can be adjusted to cause an axial displacement is coupled to the structural component (22, 24) coupled in a manner fixed against relative rotation to the rotatable bearing part (14, 16).

17. The conveyor device of claim 16, characterized by a sensor (A) that detects the location of the conveyor belt (30) and by a control unit, with which the adjusting mechanism is triggered in response to detection signals output by the sensor.

18. The conveyor device of claim 1, characterized in that the outer face of the roller is provided at least in part with friction-increasing means (18a, 28a).

19. The conveyor device of claim 18, characterized in that the friction-increasing means (18a, 28a) have elements comprising an elastomer material.

20. The conveyor device of claim 18, characterized in that the friction-increasing means have radial protrusions (18b, 28b) extending in the axial direction and separated from one another in the circumferential direction of the roller by grooves (18c, 28c).

21. The conveyor device of claim 18, characterized in that the friction-increasing means (18a, 28a) have elements comprising rubber material.

\* \* \* \* \*